(12) United States Patent
Goto et al.

(10) Patent No.: US 11,480,694 B2
(45) Date of Patent: Oct. 25, 2022

(54) SCINTILLATOR PANEL, AND RADIATION DETECTOR

(71) Applicant: HAMAMATSU PHOTONICS K.K., Hamamatsu (JP)

(72) Inventors: Keisuke Goto, Hamamatsu (JP); Kazuhiro Shirakawa, Hamamatsu (JP); Hidenori Jonishi, Hamamatsu (JP); Masashi Hatanaka, Hamamatsu (JP); Haruki Yamaji, Hamamatsu (JP); Jun Sakurai, Hamamatsu (JP); Yutaka Kusuyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 34 days.

(21) Appl. No.: 17/211,735

(22) Filed: Mar. 24, 2021

(65) Prior Publication Data

US 2021/0231818 A1 Jul. 29, 2021

Related U.S. Application Data

(63) Continuation of application No. 16/650,651, filed as application No. PCT/JP2018/025230 on Jul. 3, 2018, now Pat. No. 10,983,224.

(30) Foreign Application Priority Data

Sep. 27, 2017 (JP) .............................. JP2017-186578

(51) Int. Cl.
*G01T 1/20* (2006.01)
*G21K 4/00* (2006.01)

(52) U.S. Cl.
CPC .............. *G01T 1/2006* (2013.01); *G21K 4/00* (2013.01)

(58) Field of Classification Search
CPC ..... G01T 1/2006; G01T 1/2002; G01T 1/202; G21K 4/00; G21K 2004/06; C09K 11/7705
See application file for complete search history.

(56) References Cited

U.S. PATENT DOCUMENTS 4,656,359 A * 4/1987 Persyk .................... G01T 1/202
250/367
6,608,312 B1 8/2003 Okada et al.
(Continued)

FOREIGN PATENT DOCUMENTS

CN 104240786 A 12/2014
CN 105051829 A 11/2015
(Continued)

OTHER PUBLICATIONS

Yang et al., "Effect of humanity on scintillation performance in Na and Tl activated CsI crystals," Apr. 2014, IEEE Transactions on Nuclear Science, vol. 61, No. 2, pp. 1024-1031, (Year: 2014).
(Continued)

*Primary Examiner* — Kiho Kim
(74) *Attorney, Agent, or Firm* — Faegre Drinker Biddle & Reath LLP (57) ABSTRACT

A scintillator panel includes a substrate, a resin protective layer formed on the substrate and made of an organic material, a barrier layer formed on the resin protective layer and including thallium iodide as a main component, and a scintillator layer formed on the barrier layer and including cesium iodide with thallium added thereto as a main component. According to this scintillator panel, moisture resistance can be improved due to the barrier layer provided therein.

5 Claims, 8 Drawing Sheets

(56) References Cited

U.S. PATENT DOCUMENTS

| | | |
|---|---|---|
| 9,158,009 B2 | 10/2015 | Yoshida et al. |
| 2008/0179543 A1 | 7/2008 | Nakamura et al. |
| 2008/0308736 A1 | 12/2008 | Suzuki et al. |
| 2009/0065705 A1 | 3/2009 | Fuchs et al. |
| 2011/0198505 A1* | 8/2011 | Ishida .................. G01T 1/202 250/363.01 |
| 2013/0068953 A1 | 3/2013 | Itaya et al. |
| 2014/0145086 A1 | 5/2014 | Ishii et al. |
| 2014/0361182 A1 | 12/2014 | Hasegawa et al. |
| 2015/0362602 A1 | 12/2015 | Yoshida |
| 2018/0026145 A1 | 1/2018 | Kamakura et al. |

FOREIGN PATENT DOCUMENTS

| | | |
|---|---|---|
| JP | WO 02/061459 A1 | 8/2002 |
| JP | 2006-052982 A | 2/2006 |
| JP | 2007-232636 A | 9/2007 |
| JP | 2008-051793 A | 3/2008 |
| JP | 2008-261651 A | 10/2008 |
| JP | WO 2011/065302 A1 | 6/2011 |
| JP | 2012-098110 A | 5/2012 |
| JP | 2012-251974 A | 12/2012 |
| JP | 5152179 B2 | 2/2013 |
| JP | 2013-113685 A | 6/2013 |
| JP | 2015-004551 A | 1/2015 |
| JP | 2015-017972 A | 1/2015 |
| JP | 2015-064284 A | 4/2015 |
| WO | WO 2011/148700 A1 | 12/2011 |
| WO | WO 2014/171343 A1 | 10/2014 |

OTHER PUBLICATIONS

International Preliminary Report on Patentability dated Apr. 9, 2020 for PCT/JP2018/025230.

* cited by examiner

SCINTILLATOR PANEL, AND RADIATION DETECTOR

TECHNICAL FIELD

The present invention relates to a scintillator panel and a radiation detector.

BACKGROUND ART

Patent Literature 1 to Patent Literature 3 are known as technologies in this field.

Patent Literature 1 discloses a scintillator panel. The scintillator panel has a metal film provided between a resin substrate and a fluorescent body layer.

Patent Literature 2 discloses a radiation detection apparatus including a scintillator panel. The scintillator panel has a scintillator layer having cesium iodide as a main component. Thallium is doped into the scintillator layer. The thallium is highly concentrated near an interface of the scintillator layer with respect to a substrate. According to a concentration distribution of the thallium, an optical output is improved.

Patent Literature 3 discloses a radiation detector including a fluorescent body layer. The radiation detector has a scintillator layer having cesium iodide as a main component. Thallium is doped into the scintillator layer. The thallium is highly concentrated on a substrate side in the scintillator layer. According to a concentration distribution of the thallium, adhesion between a sensor substrate and the fluorescent body layer is improved.

CITATION LIST

Patent Literature

Patent Literature 1: PCT International Publication No. WO2011/065302
Patent Literature 2: Japanese Unexamined Patent Publication No. 2008-51793
Patent Literature 3: Japanese Unexamined Patent Publication No. 2012-98110

SUMMARY OF INVENTION

Technical Problem

Growth substrates for growing a scintillator layer sometimes have moisture permeability of allowing moisture to permeate thereinto. Moisture which has permeated into a growth substrate arrives at a base portion of the scintillator layer. It is known that a scintillator layer formed of cesium iodide is deliquescent. Due to moisture supplied through the growth substrate, deliquescence occurs in the base portion of the scintillator layer. As a result, characteristics of a scintillator panel deteriorate. Accordingly, in this field, it is desired that the moisture resistance of a scintillator panel having a scintillator layer formed of cesium iodide be improved.

For example, a scintillator panel of Patent Literature 1 has a metal film provided between a substrate and a fluorescent body layer. The metal film hinders movement of moisture from the resin substrate to the fluorescent body layer.

An object of the present invention is to provide a scintillator panel and a radiation detector, in which the moisture resistance can be improved.

Solution to Problem

According to an aspect of the present invention, there is provided a scintillator panel including a substrate, an intermediate layer formed on the substrate and made of an organic material, a barrier layer formed on the intermediate layer and including thallium iodide as a main component, and a scintillator layer formed on the barrier layer and constituted of a plurality of columnar crystals including cesium iodide with thallium added thereto as a main component.

The scintillator layer of the scintillator panel is formed on the substrate with the intermediate layer and the barrier layer therebetween. The barrier layer includes thallium iodide as a main component. The barrier layer has properties of allowing scarcely any moisture to permeate thereinto. As a result, moisture which tends to move from the intermediate layer made of an organic material to the scintillator layer can be blocked by the barrier layer. That is, since deliquescence in a base portion of the scintillator layer is curbed, deterioration in characteristics of the scintillator panel can be curbed consequently. Accordingly, it is possible improve the moisture resistance of the scintillator panel.

In the scintillator panel, the substrate may include any one of a metal material, a carbon material, a glass material, and a resin material as a main component. According to this constitution, it is possible to apply characteristics based on material characteristics to the substrate.

In the scintillator panel, the organic material may include any one of a xylylene resin, an acrylic resin, a silicone resin, and a polyimide or polyester resin. According to this constitution, it is possible to apply characteristics based on the material characteristics to the intermediate layer.

According to another aspect of the present invention, there is provided a radiation detector including a scintillator panel having a substrate, an intermediate layer formed on the substrate and made of an organic material, a barrier layer formed on the intermediate layer and including thallium iodide as a main component, and a scintillator layer formed on the barrier layer and constituted of a plurality of columnar crystals including cesium iodide with thallium added thereto as a main component; and a sensor substrate including a photo-detection surface provided with a photoelectric conversion element receiving light generated in the scintillator panel. The photo-detection surface of the sensor substrate faces the scintillator layer.

In the radiation detector, light is generated due to radiation incident on the scintillator panel, and light is detected by the photoelectric conversion element provided on the photo-detection surface. The radiation detector has the intermediate layer made of an organic material and the barrier layer including thallium iodide as a main component between the substrate and the scintillator layer.

According to the barrier layer, movement of moisture from the intermediate layer to the scintillator layer can be blocked. Accordingly, since deliquescence in the base portion of the scintillator layer is curbed, deterioration in characteristics of the scintillator panel can be curbed. As a result, in the radiation detector, deterioration in characteristics of detecting radiation is curbed. Accordingly, it is possible for the radiation detector to have improved moisture resistance.

In the radiation detector, the substrate may include any one of a metal material, a carbon material, a glass material, and a resin material as a main component. According to this constitution, it is possible to apply characteristics based on the material characteristics to the substrate.

In the radiation detector, the organic material may include any one of a xylylene resin, an acrylic resin, a silicone resin, polyimide, and a polyester resin. According to this constitution, it is possible to apply characteristics based on the material characteristics to the intermediate layer.

According to still another aspect of the present invention, there is provided a radiation detector including a substrate, an intermediate layer formed on the substrate and made of an organic material, a barrier layer formed on the intermediate layer and including thallium iodide as a main component, and a scintillator layer formed on the barrier layer and constituted of a plurality of columnar crystals including cesium iodide with thallium added thereto as a main component. The substrate has a photo-detection surface provided with a photoelectric conversion element receiving light generated in the scintillator layer.

In the radiation detector, light is generated due to radiation incident on the scintillator panel. Light is detected by the photoelectric conversion element provided on the photo-detection surface. The radiation detector has the intermediate layer made of an organic material and the barrier layer including thallium iodide as a main component between the substrate and the scintillator layer. According to the barrier layer, movement of moisture from the intermediate layer to the scintillator layer can be blocked. Accordingly, since deliquescence in the base portion of the scintillator layer is curbed, deterioration in characteristics of the scintillator panel can be curbed. As a result, in the radiation detector, deterioration in characteristics of detecting radiation is curbed. Accordingly, it is possible for the radiation detector to have improved moisture resistance.

In the radiation detector, the substrate may include any one of a metal material, a carbon material, and a glass material as a main component. According to this constitution, it is possible to apply characteristics based on the material characteristics to the substrate.

In the radiation detector, the organic material may include any one of a xylylene resin, an acrylic resin, a silicone resin, a polyimide or polyester resin, a siloxane resin, and an epoxy resin. According to this constitution, it is possible to apply characteristics based on the material characteristics the intermediate layer.

Advantageous Effects of Invention

According to the present invention, there are provided a scintillator panel and a radiation detector, in which the moisture resistance can be improved.

DESCRIPTION OF EMBODIMENTS

Hereinafter, with reference to the accompanying drawings, embodiments of the present invention will be described in detail. In description of the drawings, the same reference signs will be applied to the same elements, and duplicate description will be omitted.

First Embodiment

Figure 1:
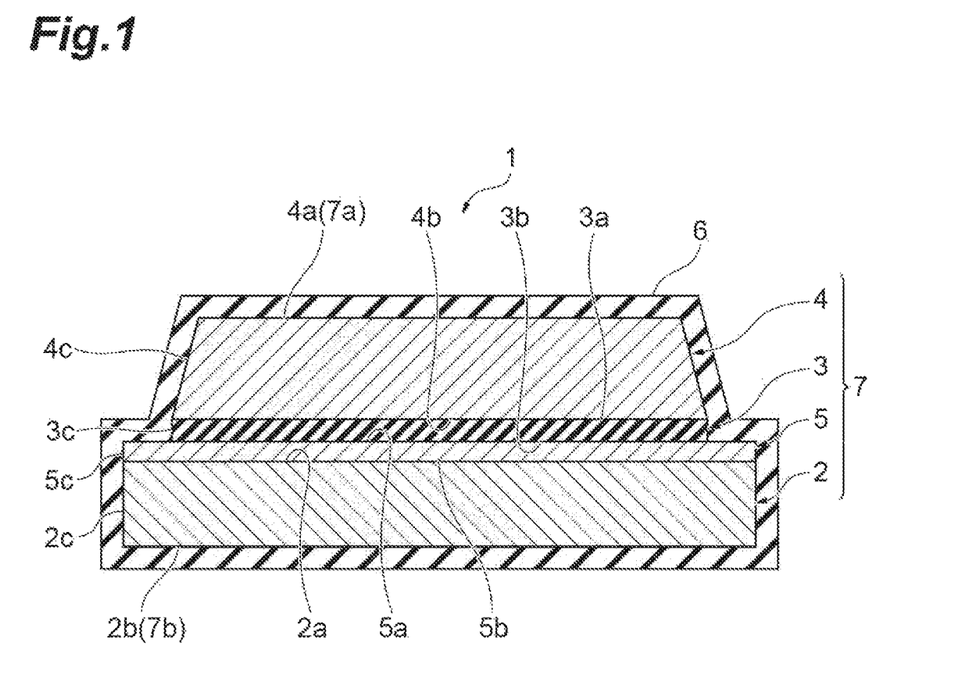
FIG. 1 is a cross-sectional view illustrating a scintillator panel according to a first embodiment.

As illustrated in FIG. 1, a scintillator panel 1 according to a first embodiment has a substrate 2, a resin protective layer 5 (intermediate layer), a scintillator layer 4, and a protective film 6. The scintillator panel 1 is combined with a photoelectric conversion element (not illustrated) and is used as a radiation image sensor.

The substrate 2, the resin protective layer 5, a barrier layer 3, and the scintillator layer 4 are laminated in this order in a thickness direction thereof and constitute a laminated body 7. Specifically, the resin protective layer 5 is formed on the substrate 2. The barrier layer 3 is formed on the resin protective layer 5. The scintillator layer 4 is formed on the barrier layer 3. The resin protective layer 5 and the barrier layer 3 are present between the substrate 2 and the scintillator layer 4. The substrate 2 and the scintillator layer 4 do not directly come into contact with each other. The laminated body 7 is covered with the protective film 6.

The substrate 2 constitutes a base body of the scintillator panel 1. The substrate 2 exhibits a rectangular shape, a polygonal shape, or a circular shape in a plan view. The thickness of the scintillator panel 1 is within a range of 10 micrometers to 5,000 micrometers. As an example, the thickness of the scintillator panel 1 is 100 micrometers. The substrate 2 has a substrate front surface 2a, a substrate rear surface 2b, and a substrate side surface 2c. The substrate 2 is made of a metal material, a carbon material, a ceramic material, or a resin material. Examples of a metal material include aluminum, stainless steel (SUS), and copper. Examples of a carbon material include amorphous carbon. Examples of a ceramic material include glass and alumina. Examples of a resin material include polyethylene terephthalate, polyethylene naphthalate, polyimide, and polyetheretherketone.

When the substrate 2 is made of a metal material, the resin protective layer 5 hinders the scintillator layer 4 from coming into direct contact with the substrate 2. As a result, the substrate 2 does not come into direct contact with the scintillator layer 4, and therefore corrosion of the metal substrate 2 due to direct contact is prevented. Accordingly, the resin protective layer 5 has an area larger than at least the scintillator layer 4. Alternatively, when the substrate 2 is made of a carbon material, a ceramic material, or a resin material, film formation of a root part of the scintillator layer 4 constituted of a plurality of columnar crystals is favorably performed with respect to the substrate 2 by providing the resin protective layer 5 on the substrate 2. As a result, favorable columnar crystals can grow. The resin protective layer 5 has a protective layer front surface 5a, a protective layer rear surface 5b, and a protective layer side surface 5c. The protective layer front surface 5a faces the barrier layer 3. The protective layer rear surface 5b faces the substrate front surface 2a. The protective layer side surface 5c is flush with the substrate side surface 2c. The resin protective layer 5 is formed on the entire surface of the substrate front surface 2a. The resin protective layer 5 may cover the substrate rear surface 2b and the substrate side surface 2c from above, in addition to the substrate front surface 2a. The resin protective layer 5 may cover the entirety of the substrate 2. The resin protective layer 5 is made of a resin material. Examples of a resin material include a xylylene resin such as polyparaxylylene, an acrylic resin, a silicone resin, and a polyimide or polyester resin.

The barrier layer 3 hinders movement of moisture from the resin protective layer 5 to the scintillator layer 4. The barrier layer 3 is formed on a region of a part on the protective layer front surface 5a. When viewed in the thickness direction, the barrier layer 3 is smaller than the resin protective layer 5 and the substrate 2. The thickness of the barrier layer 3 is within a range of 0.001 micrometers to 1.0 micrometer. As an example, the thickness of the barrier layer 3 is 0.06 micrometers (600 angstroms). The barrier layer 3 has a barrier layer front surface 3a, a barrier layer rear surface 3b, and a barrier layer side surface 3c. The barrier layer front surface 3a faces the scintillator layer 4. The barrier layer rear surface 3b faces the protective layer front surface 5a. The barrier layer 3 includes thallium iodide (TlI) as a main component. For example, the TlI content of the barrier layer 3 may be within a range of 90% to 100%. When the TlI content in the barrier layer 3 is 90% or more, it may be stated that the barrier layer 3 has TlI as a main component. For example, the barrier layer 3 may be formed by a two-source vapor deposition method. Specifically, a first vapor deposition source containing cesium iodide (CsI) and a second vapor deposition source containing thallium iodide (TlI) are utilized. The barrier layer 3 is formed by performing vapor deposition of TlI on a substrate prior to CsI. As an example, the thickness of the barrier layer 3 is approximately 600 angstroms. The thickness of the barrier layer 3 can be measured by causing a scintillator layer and a substrate to peel off using a strong adhesive tape or the like and analyzing a substrate interface using an X-ray fluorescence analysis (XRF) apparatus. Examples of X-ray fluorescence analysis apparatuses can include ZSX Primus of RIGAKU Corporation.

The scintillator layer 4 receives radiation and generates light corresponding to the radiation. The thickness of the scintillator layer 4 is within a range of 10 micrometers to 3,000 micrometers. As an example, the thickness of the scintillator layer 4 is 600 micrometers. The scintillator layer 4 is a fluorescent body material and including cesium iodide with thallium added thereto as a main component. The cesium iodide includes thallium as a dopant (CsI:Tl). For example, the CsI content of the scintillator layer 4 may be within a range of 90% to 100%. When the CsI content of the scintillator layer 4 is 90% or more, it may be stated that the scintillator layer 4 has CsI as a main component. The scintillator layer 4 is constituted of a plurality of columnar crystals. Each of the columnar crystals exhibits a light guiding effect. Accordingly, the scintillator layer 4 is suitable for high-resolution imaging. The scintillator layer 4 may be formed by a vapor deposition method, for example.

The scintillator layer 4 has a scintillator layer front surface 4a, a scintillator layer rear surface 4b, and a scintillator layer side surface 4c. The scintillator layer 4 is formed on the barrier layer 3 such that the scintillator layer rear surface 4b faces the barrier layer front surface 3a. The barrier layer 3 is present between the scintillator layer 4 and the resin protective layer 5. The scintillator layer 4 does not directly come into contact with the resin protective layer 5. When viewed in the thickness direction, the barrier layer 3 is smaller than the substrate 2 and the resin protective layer 5. Similarly, in the scintillator layer 4 as well, when viewed in the thickness direction, the scintillator layer 4 is smaller than the substrate 2 and the resin protective layer 5.

The scintillator layer 4 includes a plurality of columnar crystals extending in the thickness direction of the scintillator layer 4. Base portions of the plurality of columnar crystals constitute the scintillator layer rear surface 4b. The base portions come into contact with the barrier layer front surface 3a of the barrier layer 3. Tip portions of the plurality of columnar crystals constitute the scintillator layer front surface 4a.

The scintillator layer 4 exhibits a truncated pyramid shape. The scintillator layer side surface 4c is tilted with respect to the thickness direction of the scintillator layer side surface 4c. The scintillator layer side surface 4c is a slope (inclination). Specifically, when the scintillator layer 4 is viewed in a cross-sectional view in a direction orthogonal to the thickness direction, a cross section exhibits a trapezoidal shape. That is, one side on the scintillator layer front surface 4a side is shorter than one side on the scintillator layer rear surface 4b side.

The protective film 6 covers the laminated body 7. As a result, the protective film 6 protects the laminated body 7 from moisture. The protective film 6 covers the substrate rear surface 2b, the substrate side surface 2c, the protective layer side surface 5c, the barrier layer side surface 3c, the scintillator layer side surface 4c, and the scintillator layer front surface 4a. The thickness of the protective film 6 may be substantially the same at all places where it is formed. In addition, the thickness of the protective film 6 may vary at every place. In the protective film 6, for example, a film portion formed on the scintillator layer front surface 4a is thicker than film portions formed on the substrate rear surface 2b, the substrate side surface 2c, the barrier layer side surface 3c, and the scintillator layer side surface 4c. The protective film 6 may include polyparaxylylene as a main component. The protective film 6 may be formed by a chemical vapor deposition (CVD) method, for example.

In the scintillator panel 1, the barrier layer 3 is provided between the resin protective layer 5 and the scintillator layer 4. The barrier layer 3 includes thallium iodide as a main component. The barrier layer 3 has properties of allowing scarcely any moisture to permeate thereinto. Accordingly, moisture which tends to move from the resin protective layer 5 to the scintillator layer 4 can be blocked by the barrier layer 3. As a result, deliquescence in the base portion of the scintillator layer 4 is curbed. Therefore, deterioration in characteristics of the scintillator panel 1 can be curbed. Accordingly, the moisture resistance of the scintillator panel 1 can be improved.

Second Embodiment

Figure 2:
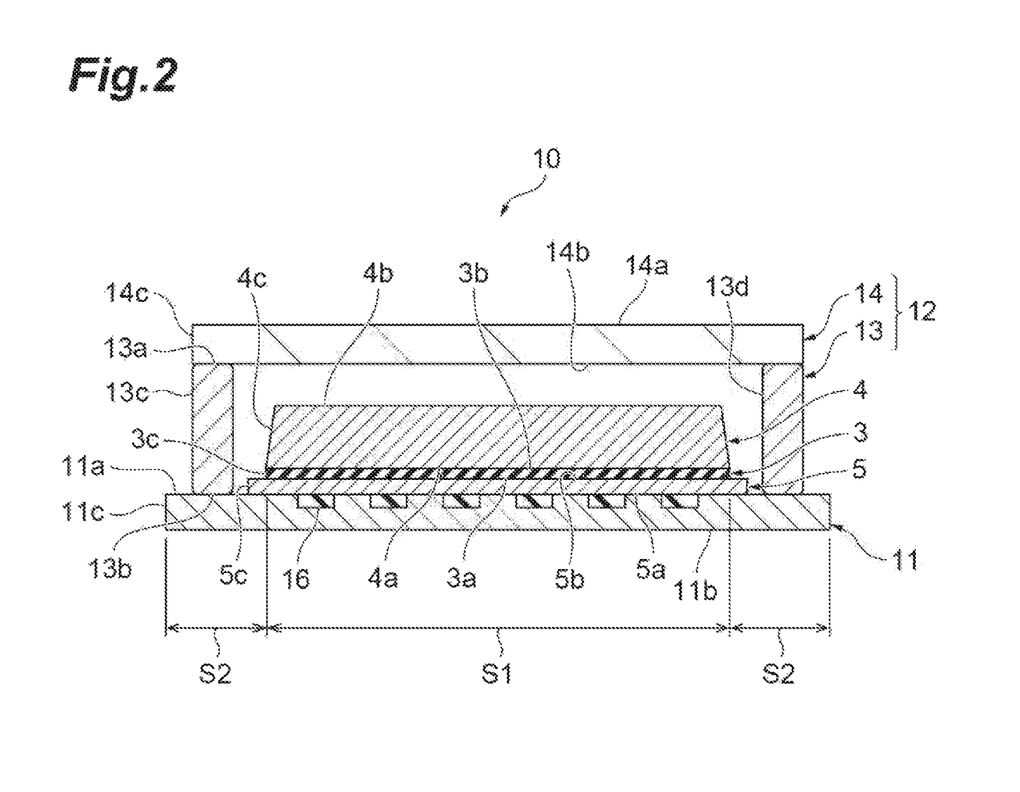
FIG. 2 is a cross-sectional view illustrating a radiation detector according to a second embodiment.

A radiation detector according to a second embodiment will be described. Actually, a region (side) for achieving electrical conduction is provided on a sensor panel 11. However, it is not illustrated in each of the drawings for the sake of convenience.

As illustrated in FIG. 2, a radiation detector 10 has the sensor panel 11 (sensor substrate), the resin protective layer 5, the barrier layer 3, the scintillator layer 4, and a sealing portion 12. Radiation received from a sealing plate 14 is incident on the scintillator layer 4. The scintillator layer 4 generates light corresponding to the radiation. The light passes through the resin protective layer 5 and the barrier layer 3 and is incident on the sensor panel 11. The sensor panel 11 generates an electrical signal in response to the incident light. The electrical signal is output through a predetermined electric circuit. According to the electrical signal, a radiation image is obtained.

The sensor panel 11 has a panel front surface 11a, a panel rear surface 11b, and a panel side surface 11c. The sensor panel 11 is a CCD sensor, a CMOS sensor, or a TFT panel having a photoelectric conversion element 16. The sensor panel 11 includes a semiconductor such as silicon, or glass as a main component. The sensor panel 11 may include an organic material as a main component. Examples of an organic material include polyethylene terephthalate (PET), polyethylene naphthalate (PEN), and polyimide (PI). A plurality of photoelectric conversion elements 16 are disposed on the panel front surface 11a in a two-dimensional manner. A region on the panel front surface 11a on which a plurality of photoelectric conversion elements 16 are disposed is a photo-detection region S1 (photo-detection surface). In addition to the photo-detection region S1, the panel front surface 11a includes a surrounding region S2 surrounding the photo-detection region S1. In order to protect the photoelectric conversion elements 16, the resin protective layer 5 is provided. The resin protective layer 5 is a polyimide or siloxane resin or an epoxy resin, for example. In order to enhance crystallinity of the scintillator layer made of a plurality of columnar crystals, the resin protective layer 5 similar to that in the first embodiment may be provided.

The sealing portion 12 covers a portion of the protective layer rear surface 5b of the sensor panel 11, the barrier layer 3, and the scintillator layer 4. The sealing portion 12 is fixed to the surrounding region S2 on the protective layer rear surface 5b. The sealing portion 12 air-tightly maintains an internal space formed by the sealing portion 12 and the resin protective layer 5. Due to this constitution, the scintillator layer 4 is protected from moisture.

The sealing portion 12 has a sealing frame 13 and the sealing plate 14. The sealing frame 13 has a frame front surface 13a, a frame rear surface 13b, and a frame wall portion 13c. The frame wall portion 13c joins the frame front surface 13a and the frame rear surface 13b to each other. The height of the frame wall portion 13c (that is, the length from the frame front surface 13a to the frame rear surface 13b) is higher than the height from the protective layer rear surface 5b to the scintillator layer rear surface 4b. A gap is formed between the scintillator layer rear surface 4b and the sealing plate 14.

The sealing frame 13 may be constituted of a resin material, a metal material, or a ceramic material, for example. The sealing frame 13 may be solid or hollow. The frame front surface 13a and a plate rear surface 14b, and the frame rear surface 13b and the resin protective layer 5 may be joined to each other using an adhesive.

The sealing plate 14 is a plate material having a rectangular shape in a plan view. The sealing plate 14 has a plate front surface 14a, the plate rear surface 14b, and a plate side surface 14c. The plate rear surface 14b is fixed to the frame front surface 13a. The plate side surface 14c may be flush with an outer surface of the frame wall portion 13c. The sealing plate 14 may be constituted of a glass material, a metal material, a carbon material, or a barrier film, for example. Examples of a metal material include aluminum. Examples of a carbon material include CFRP. Examples of a barrier film include a laminated body of an organic material layer (PET or PEN) and an inorganic material layer (SiN).

In the radiation detector 10, light is generated due to radiation incident on the scintillator layer 4. Light is detected by the photoelectric conversion elements 16 provided in the photo-detection region S1. The radiation detector 10 has the barrier layer 3 including thallium iodide as a main component between the resin protective layer 5 and the scintillator layer 4. The barrier layer 3 blocks movement of moisture from the resin protective layer 5 to the scintillator layer 4. Accordingly, deliquescence in the base portion of the scintillator layer 4 is curbed. As a result, in the radiation detector 10, it is possible to curb deterioration in detection characteristics.

Hereinabove, embodiments of the present invention have been described. However, the present invention is not limited to the foregoing embodiments and can be performed in various forms. Modification examples 1 to 3 are modification examples of the first embodiment. In addition, Modification examples 4 to 9 are modification examples of the second embodiment.

Modification Example 1

Figure 3A:
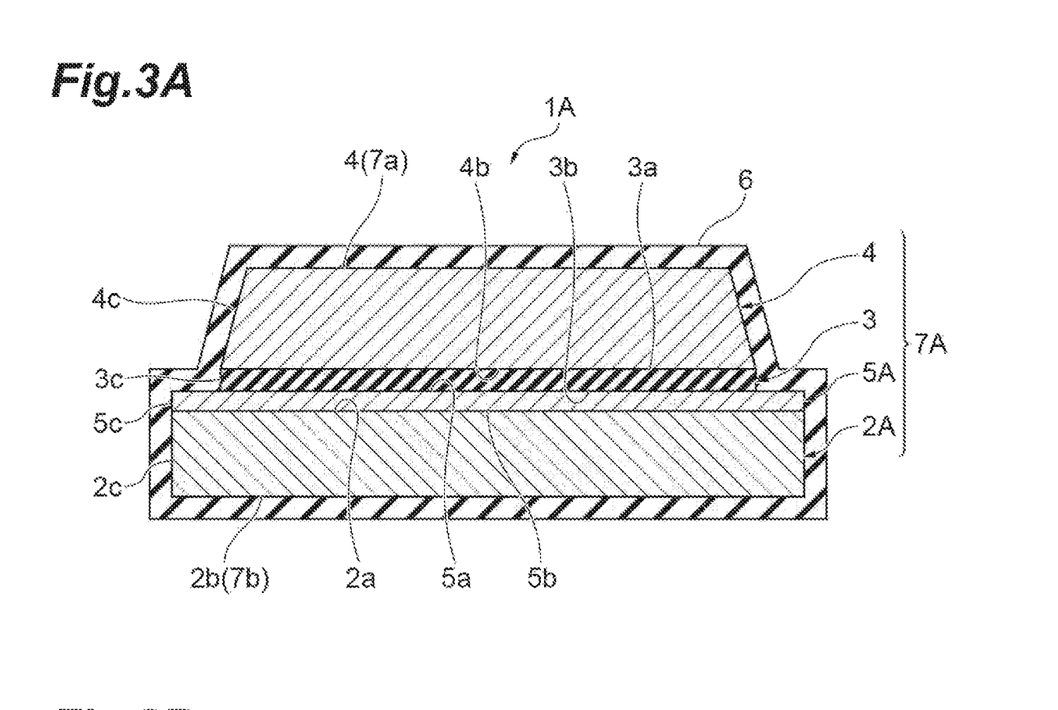
FIG. 3A is a cross-sectional view illustrating a scintillator panel according to Modification Example 1.

FIG. 3A illustrates a scintillator panel 1A according to Modification Example 1. The scintillator panel 1A according to Modification Example 1 has a substrate 2A, a resin reflective layer 5A, the barrier layer 3, the scintillator layer 4, and the protective film 6. The constituent material of the substrate 2A is not particularly limited. The substrate 2A may be constituted of a metal material and a carbon material and may be constituted of a glass material and/or a resin material. Examples of a metal material include aluminum and stainless steel (SUS). Examples of a carbon material include amorphous carbon, carbon fiber reinforced plastic (CFRP). Examples of a resin material include polyethylene terephthalate (PET), polyethylene naphthalate (PEN), and polyimide (PI). The resin reflective layer 5A reflects light generated in the scintillator layer 4. The resin reflective layer 5A may be constituted of a mixed material of a white pigment and a binder resin, for example. Examples of the white pigment include alumina, titanium oxide, yttrium oxide, and zirconium oxide. The protective film 6 may be constituted of polyparaxylylene. The protective film 6 may be formed by a chemical vapor deposition method (CVD method).

Modification Example 2

Figure 3B:
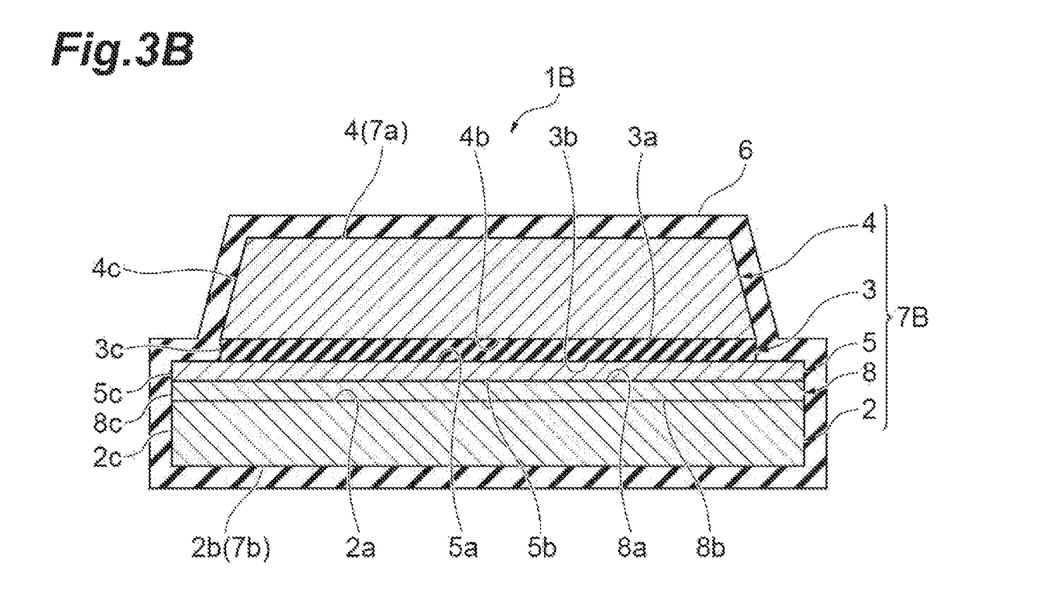
FIG. 3B is a cross-sectional view illustrating a scintillator panel according to Modification Example 2.

FIG. 3B illustrates a scintillator panel 1B according to Modification Example 2. The scintillator panel 1B according to Modification Example 2 has the substrate 2, an inorganic reflective layer 8, the resin protective layer 5, the barrier layer 3, the scintillator layer 4, and the protective film 6. That is, the scintillator panel 1B according to Modification Example 2 is realized by adding the inorganic reflective layer 8 to the scintillator panel 1 according to the first embodiment. The inorganic reflective layer 8 is formed between the substrate 2 and the resin protective layer 5. Specifically, the inorganic reflective layer 8 has a reflective layer front surface 8a, a reflective layer rear surface 8b, and a reflective layer side surface 8c. The reflective layer front surface 8a faces the protective layer rear surface 5b. The reflective layer rear surface 8b faces the substrate front surface 2a. The inorganic reflective layer 8 may be constituted of a metal material, for example. Examples of a metal material include aluminum and silver. The inorganic reflective layer 8 may be a dielectric multilayer. A dielectric multilayer is a laminated film of silicon oxide (SiO2) and titanium oxide (TiO2). Examples of a resin protective layer 5 include polyimide (PI) and polyparaxylylene. According to the scintillator panel 1B, in the inorganic reflective layer 8, light generated in the scintillator layer 4 can be reflected. The resin protective layer 5 is formed between the scintillator layer 4 and the inorganic reflective layer 8. The resin protective layer 5 hinders the inorganic reflective layer 8 constituted of a metal material from directly coming into contact with the scintillator layer 4. Accordingly, occurrence of corrosion of the inorganic reflective layer 8 due to direct contact of the inorganic reflective layer 8 with the scintillator layer 4 can be curbed. When the inorganic reflective layer 8 is constituted of a dielectric multilayer, occurrence of corrosion of a metal substrate when there is a pinhole in a dielectric multilayer can be curbed by providing the resin protective layer 5.

Modification Example 3

Figure 4A:
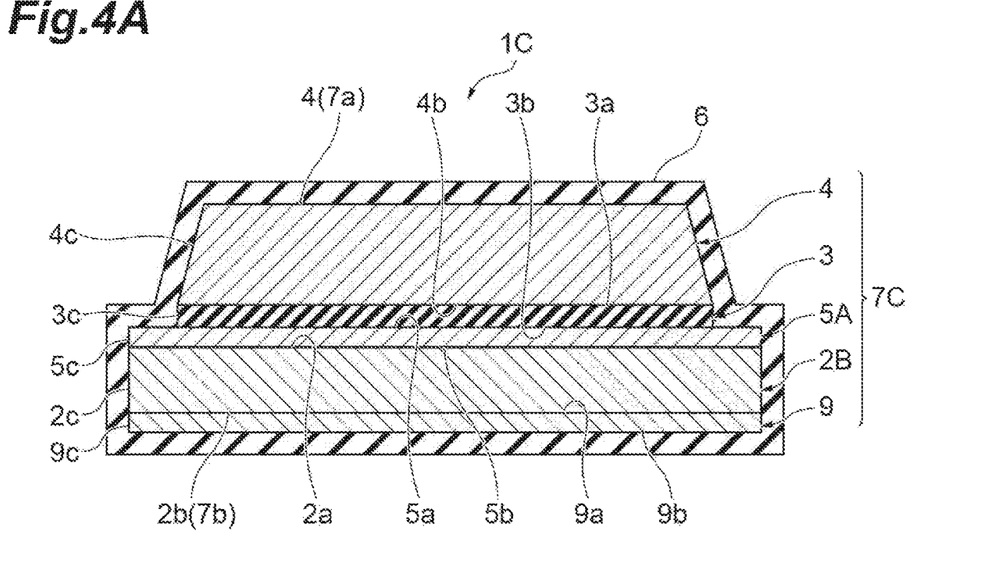
FIG. 4A is a cross-sectional view illustrating a scintillator panel according to Modification Example 3.

FIG. 4A illustrates a scintillator panel 1C according to Modification Example 3. The scintillator panel 1C has a substrate 2B, the resin reflective layer 5A, the barrier layer 3, the scintillator layer 4, and a resin film 9. The substrate 2B is constituted of a thin glass material (for example, having a thickness of 150 μm or smaller) or a carbon material such as CFRP. The substrate 2B has properties of being likely to warp. In the scintillator panel 1C, the resin film 9 is formed in order to curb warpage of the substrate 2B which may be generated at the time of forming a scintillator layer. Specifically, the resin film 9 is formed on the entire surface of the substrate rear surface 2b of the substrate 2B. The resin film 9 is a sheet member constituted of a resin material. In the resin film 9, a sheet member may be bonded to the substrate rear surface 2b. The resin film 9 may be formed through drying after being coated with a resin material. According to the resin film 9, occurrence of warpage of the substrate 2B can be curbed.

Modification Example 4

Figure 4B:
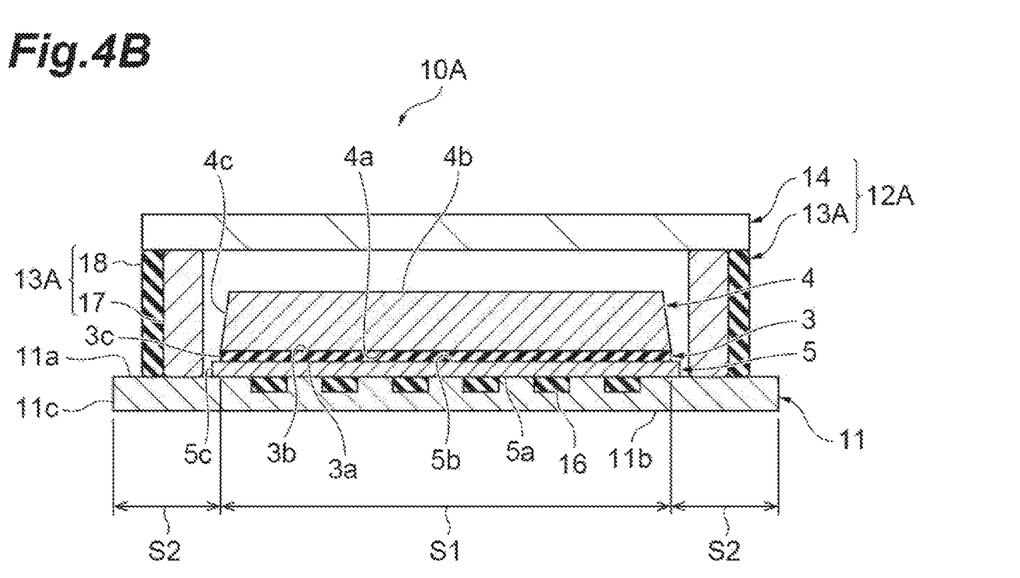
FIG. 4B is a cross-sectional view illustrating a radiation detector according to Modification Example 4.

FIG. 4B illustrates a radiation detector 10A according to Modification Example 4. The radiation detector 10A has a sealing portion 12A which differs from the radiation detector 10 according to the second embodiment. The constitutions of the barrier layer 3, the scintillator layer 4, the resin protective layer 5, and the sensor panel 11 are similar to those in the radiation detector 10 according to the second embodiment. The sealing portion 12A has the sealing plate 14 and a sealing frame 13A. The sealing frame 13A further has an inner sealing frame 17 and an outer sealing frame 18. The sealing frame 13 has a dual structure. The inner sealing frame 17 may be constituted of a resin material, for example. The outer sealing frame 18 may be constituted of a coating layer formed of an inorganic material and/or an inorganic solid material such as a glass rod, for example. According to this constitution, the scintillator layer 4 can be preferably protected from moisture.

Modification Example 5

Figure 5A:
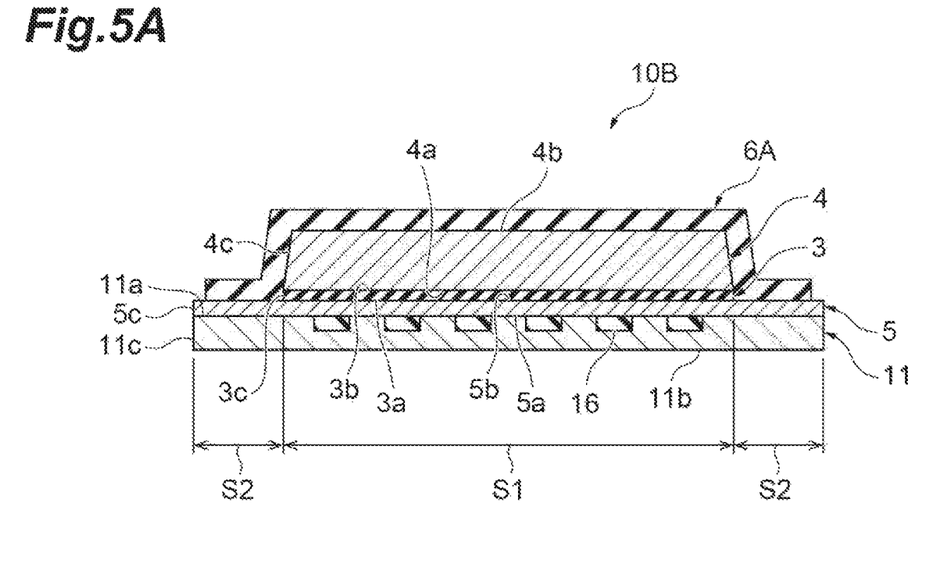
FIG. 5A is a cross-sectional view illustrating a radiation detector according to Modification Example 5.

FIG. 5A illustrates a radiation detector 10B according to Modification Example 5. The radiation detector 10B differs from the radiation detector 10 according to the second embodiment in having no sealing portion 12 and having a protective film 6A, in place of the sealing portion 12. The constitutions of the barrier layer 3, the scintillator layer 4, and the sensor panel 11 are similar to those in the radiation detector 10 according to the second embodiment. The protective film 6A covers the protective layer rear surface 5b, the barrier layer side surface 3c, the scintillator layer side surface 4c, and the scintillator layer rear surface 4b. According to this constitution, the protective film 6A can protect a scintillator layer 4A from moisture. The protective film 6A may be selected from materials similar to those of the protective film 6.

Modification Example 6

Figure 5B:
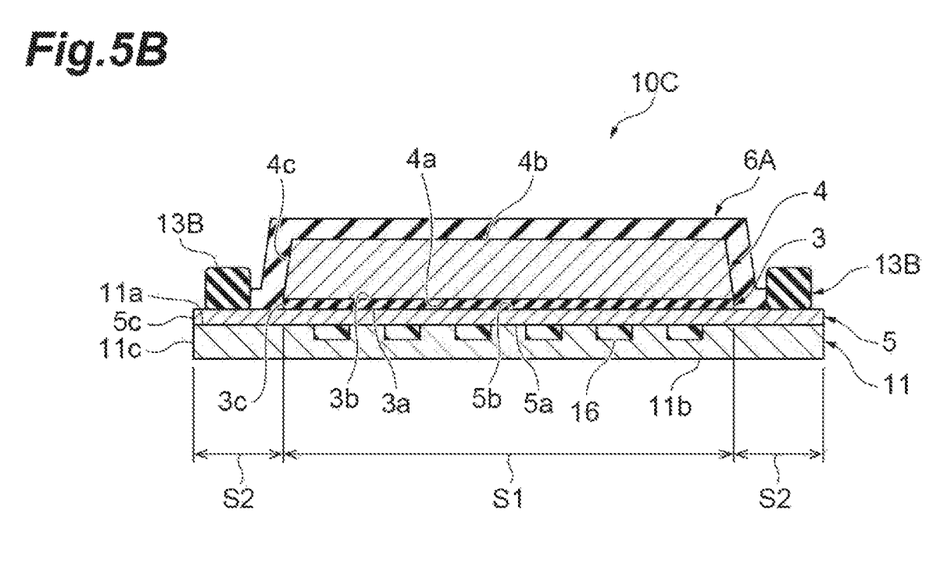
FIG. 5B is a cross-sectional view illustrating a radiation detector according to Modification Example 6.

FIG. 5B illustrates a radiation detector 10C according to Modification Example 6. The radiation detector 10C is realized by further adding a sealing frame 13B to the radiation detector 10B according to Modification Example 5. Accordingly, the scintillator layer 4, the barrier layer 3, the resin protective layer 5, the sensor panel 11, and the protective film 6A are similar to those in the radiation detector 10B according to Modification Example 5. The sealing frame 13B blocks a joining portion of the resin protective layer 5 and the protective film 6A. Accordingly, when viewed in the thickness direction in a plan view, the sealing frame 13B is formed along an outer edge of the protective film 6A. The sealing frame 13B may be constituted of a UV curable resin, for example. According to this constitution, invasion of moisture through the joining portion between the sensor panel 11 and the protective film 6A is curbed. Accordingly, the moisture resistance of the radiation detector 10C can be further enhanced.

Modification Example 7

Figure 6A:
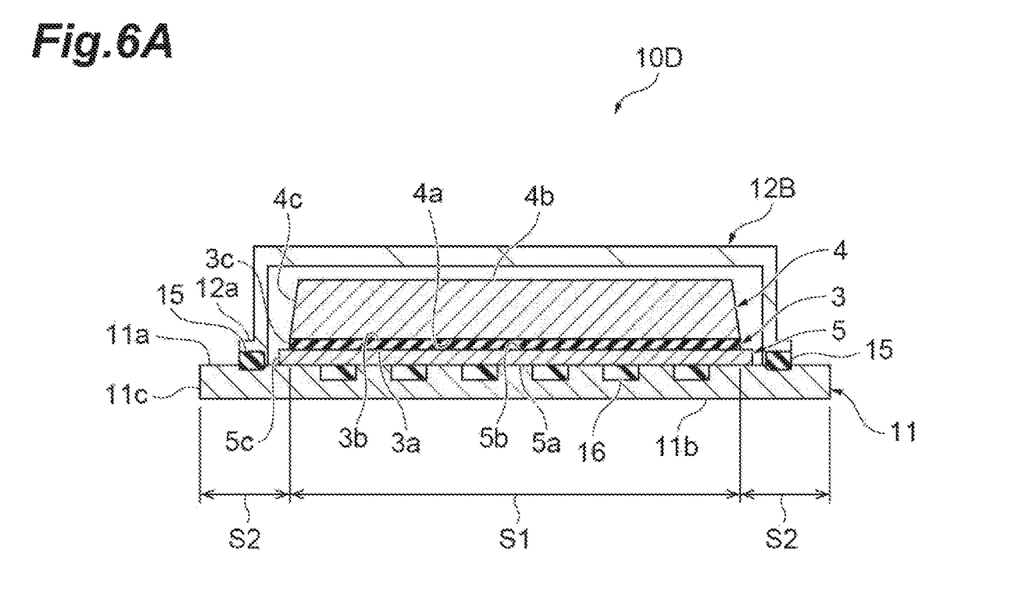
FIG. 6A is a cross-sectional view illustrating a radiation detector according to Modification Example 7.

FIG. 6A illustrates a radiation detector 10D according to Modification Example 7. The radiation detector 10D differs from the radiation detector 10 according to the second embodiment in having no sealing portion 12 of the radiation detector 10 according to the second embodiment and having a sealing sheet 12B, in place of the sealing portion 12. The constitutions of the barrier layer 3, the scintillator layer 4, the resin protective layer 5, and the sensor panel 11 are similar to those in the radiation detector 10 according to the second embodiment. The sealing sheet 12B exhibits a rectangular shape, a polygonal shape, or a circular shape in a plan view in the thickness direction. The sealing sheet 12B may be constituted of a metal foil, a metal sheet such as an aluminum sheet, or a barrier film, for example. The sealing sheet 12B covers the scintillator layer 4 and the barrier layer 3. Specifically, it covers the scintillator layer rear surface 4b, the scintillator layer side surface 4c, the barrier layer side surface 3c, and a portion of the protective layer rear surface 5b. In a plan view, the sealing sheet 12B is larger than the scintillator layer 4 and the barrier layer 3. An outer circumferential edge 12a of the sealing sheet 12B adheres to the panel front surface 11a using an adhesive 15. Accordingly, the sealing sheet 12B and the sensor panel 11 form an air-tight region containing the scintillator layer 4 and the barrier layer 3. Accordingly, the scintillator layer 4 can be protected from moisture. The adhesive 15 may include filler materials. The particle sizes of the filler materials are smaller than the thickness of the adhesion layer.

Modification Example 8

Figure 6B:
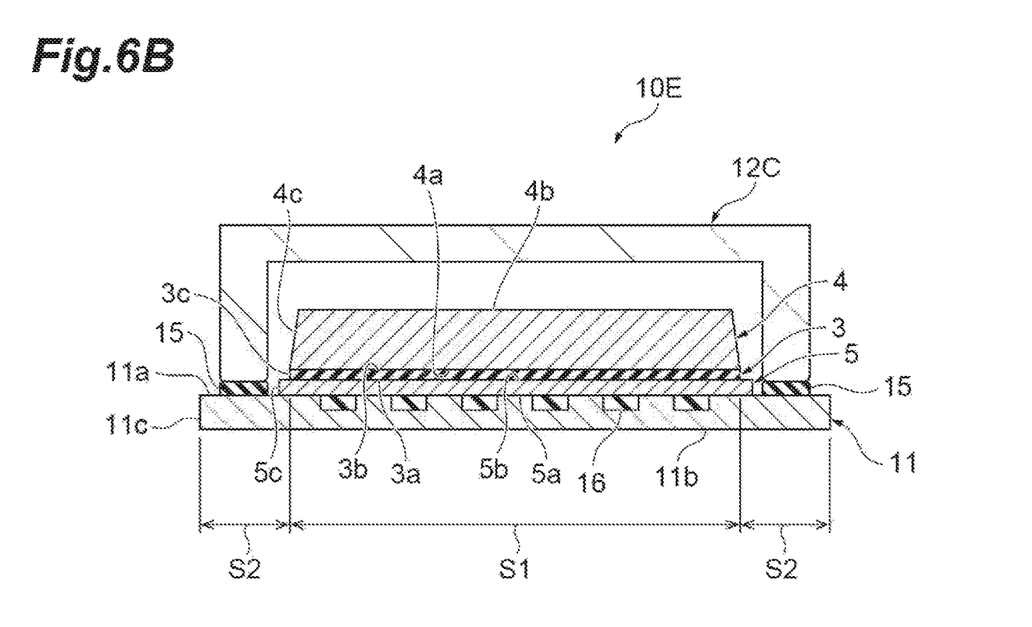
FIG. 6B is a cross-sectional view illustrating a radiation detector according to Modification Example 8.

FIG. 6B illustrates a radiation detector 10E according to Modification Example 8. The radiation detector 10E has a sealing frame 12C having a constitution different from that of the sealing sheet 12B according to Modification Example 7. The sealing frame 12C exhibits a box shape. The sealing frame 12C has an opening on a bottom surface. The sealing sheet 12B according to Modification Example 7 has flexibility. On the other hand, the sealing frame 12C according to Modification Example 8 maintains a predetermined shape and is hard. Accordingly, the sealing frame 12C may be constituted of a glass material, a metal material, or a carbon material, for example. The bottom surface of the sealing frame 12C adheres to the panel front surface 11a using the adhesive 15. According to this constitution, the scintillator layer 4 is disposed in an air-tight region formed by the sealing frame 12C and the sensor panel 11. Accordingly, in the radiation detector 10E, the scintillator layer 4 can be protected from moisture. Moreover, the sealing frame 12C is hard. As a result, in the radiation detector 10E, the scintillator layer 4 can be protected mechanically.

Modification Example 9

Figure 7A:
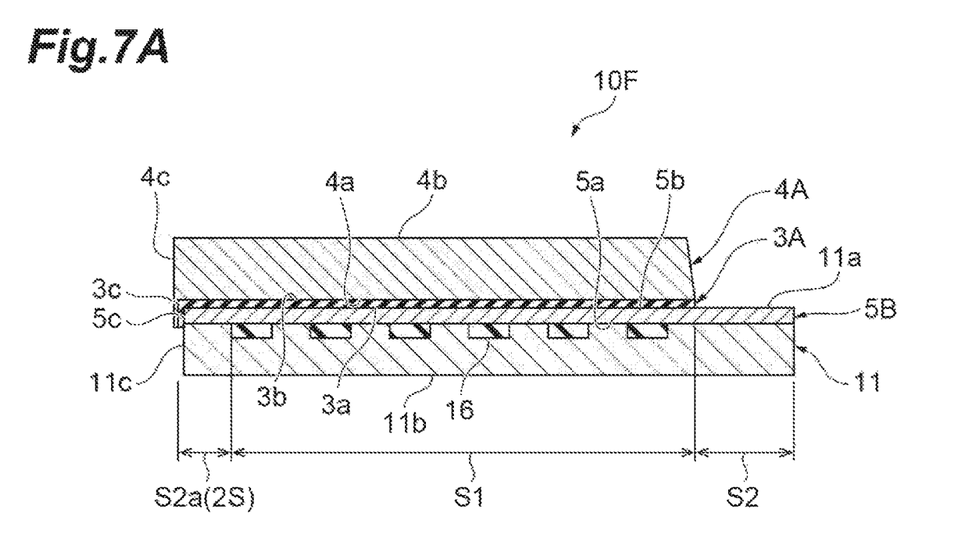
FIG. 7A is a cross-sectional view illustrating a radiation detector according to Modification Example 9.

FIG. 7A illustrates a radiation detector 10F according to Modification Example 9. The radiation detector 10F has a barrier layer 3A, the scintillator layer 4A, and a resin protective layer 5B which differ from those in the radiation detector 10 according to the second embodiment. The barrier layer 3A has the barrier layer front surface 3a, the barrier layer rear surface 3b, and the barrier layer side surface 3c. The scintillator layer 4A has the scintillator layer front surface 4a, the scintillator layer rear surface 4b, and the scintillator layer side surface 4c. The resin protective layer 5B has the protective layer front surface 5a, the protective layer rear surface 5b, and the protective layer side surface 5c. The single body constitution of the sensor panel 11 is similar to that in the radiation detector 10 according to the second embodiment. The scintillator layer 4A is formed on one side surface of the sensor panel 11 such that it protrudes from the photo-detection region S1. Specifically, first, the resin protective layer 5B is formed on the photo-detection region S1 and a peripheral region S2a on one side. Next, the barrier layer 3A is formed on the photo-detection region S1, the panel side surface 11c on one side, and the peripheral region S2a between the photo-detection region S1 and the panel side surface 11c on one side such that the resin protective layer 5B is covered. Then, the scintillator layer 4A is formed on the entire surface of the barrier layer 3A such that the barrier layer 3A is covered. The radiation detector 10F having this constitution can be preferably used as a radiation detector for mammography. In such application of the radiation detector 10F, the scintillator layer 4A is disposed such that a side formed to protrude from the photo-detection region S1 is positioned on the breast-wall side of an examinee.

Modification Example 10

Figure 7B:
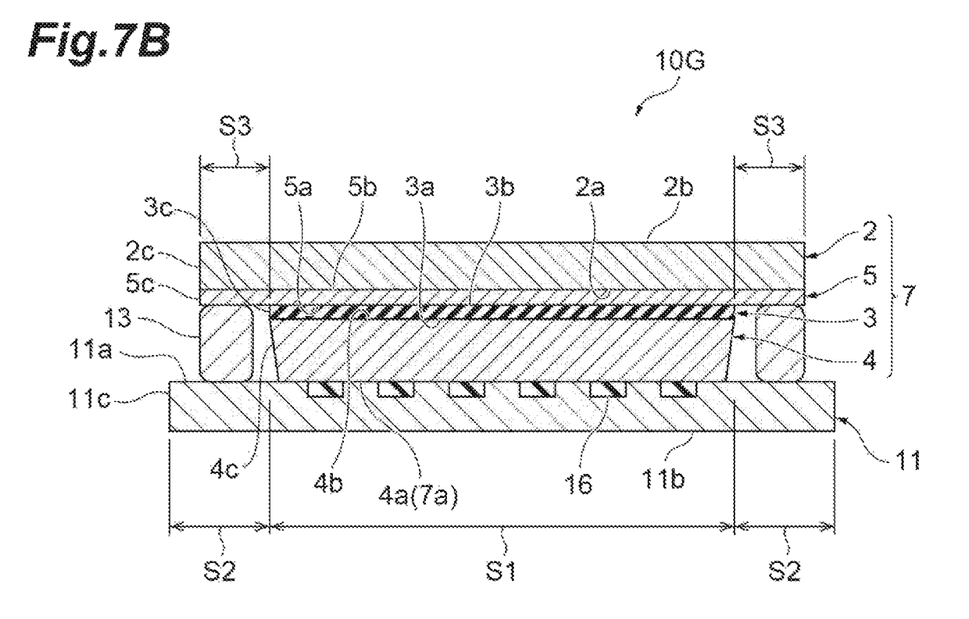
FIG. 7B is a cross-sectional view illustrating a radiation detector according to Modification Example 10.

FIG. 7B illustrates a radiation detector 10G according to Modification Example 10. The radiation detector 10G according to Modification Example 10 has the substrate 2, the resin protective layer 5, the barrier layer 3, the scintillator layer 4, and the sensor panel 11.

In the radiation detector 10G, the scintillator layer front surface 4a is attached to the sensor panel 11 such that it faces the panel front surface 11a. According to this constitution, an exposed region S3 in the substrate front surface 2a also faces the surrounding region S2 of the panel front surface 11a. The protective layer front surface 5a is separated from the panel front surface 11a as much as the heights of the scintillator layer 4 and the barrier layer 3. The sealing frame 13 is sandwiched between the protective layer front surface 5a and the panel front surface 11a. The sealing frame 13 and the resin protective layer 5 are fixed to each other through adhesion. Similarly, the sealing frame 13 and the sensor panel 11 are fixed to each other through adhesion (when the sealing frame 13 has adhesive properties, they adhere to each other through bonding, and when it has non-adhesive properties, an adhesive is provided in the interface). According to this constitution, the substrate 2 having the resin protective layer 5 can exhibit a function as a growth substrate for the barrier layer 3 and the scintillator layer 4, and a function as a sealing plate in the radiation detector 10G. Accordingly, the number of components constituting the radiation detector 10G can be reduced.

Experimental Example

In the experimental example, effects of improvement in moisture resistance exhibited by the barrier layer, have been confirmed. The moisture resistance stated in the present experimental example denotes a relationship between a time being exposed to an environment having predetermined humidity and a degree of change in resolution (CTF) indicated by the scintillator panel. That is, high moisture resistance denotes that the degree of deterioration in resolution indicated by the scintillator panel is low even when it is exposed to a humidity environment for a long time. On the contrary, low moisture resistance denotes that the degree of deterioration in resolution indicated by the scintillator panel is high when it is exposed to a humidity environment for a long time.

In the experimental example, first, three test bodies (scintillator panels) were prepared. Each of the test bodies had a scintillator layer and a substrate. Each of the scintillator layers included CsI as a main component, and the thickness thereof was 600 micrometers. Then, first and second test bodies had a barrier layer including TlI as a main component between the substrate and the scintillator layer. On the other hand, a third test body had no barrier layer. The third test body was a comparative example in which a scintillator layer was formed directly on a substrate. The substrate of the first test body was an organic substrate including an organic material as a main component. The first test body corresponds to a scintillator panel according to a reference example. In the second test body, a resin protective film including an organic material as a main component was formed on an aluminum substrate. The second test body corresponds to the scintillator panel according to the first embodiment. The substrate of the third test body was the same as the substrate of the second test body.

The constitutions of the first to third test bodies are as follows.

First test body: a substrate made of an organic material, a barrier layer, and a scintillator layer.

Second test body: a substrate having an organic layer, a barrier layer, and a scintillator layer.

Third test body: a substrate having an organic layer, (no barrier layer), and a scintillator layer.

The resolution of each of the first to third test bodies was obtained. The resolutions were adopted as reference values. Next, the first to third test bodies were installed in an environment testing machine in which the temperature was 40° C. and the humidity was set to 90%. Next, the resolution of each of the test bodies was obtained every predetermined time elapsed from the installation time. Then, the degrees of the ratios of the resolutions obtained with lapse of every predetermined time to the resolutions (reference values) were calculated. That is, relative values with respect to the resolutions before the test bodies were installed in the environment testing machine were obtained. For example, when the relative value was 100 percent, it indicated that the resolution obtained after the predetermined time elapsed did not change with respect to the resolution before the test bodies were installed in the environment testing machine and the performance did not deteriorate. Accordingly, it indicated that as the relative value becomes smaller, characteristics of the scintillator panel deteriorate.

Figure 8:
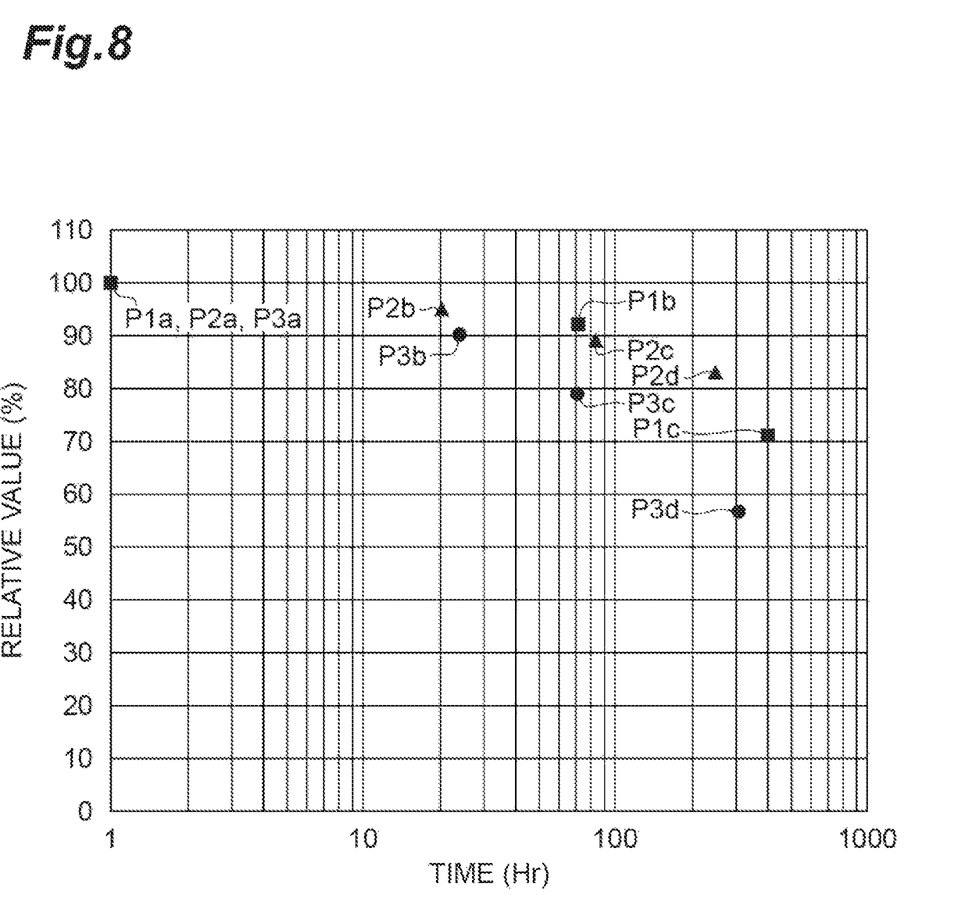
FIG. 8 is a graph showing results of an experimental example.

A graph shown in FIG. 8 shows a relationship between the time being exposed to the foregoing environment (horizontal axis) and the relative value (vertical axis). The resolution of the first test body was measured after an hour, after 72 hours, and after 405 hours from the installation time. Measurement results were indicated as plots P1a, P1b, and P1c. The resolution of the second test body was measured after an hour, after 20.5 hours, after 84 hours, and after 253 hours from the installation time. Measurement results were indicated as plots P2a, P2b, P2c, and P2d. The resolution of the third test body was measured after an hour, after 24 hours, after 71 hours, and after 311 hours from the installation time. Measurement results were indicated as plots P3a, P3b, P3c, and P3d.

The measurement results thereof were confirmed that performance of the third test body (plots P3a, P3b, P3c, and P3d) having no barrier layer deteriorated the most among the first to third test bodies. It was assumed that deterioration in performance occurred in the third test body because moisture percolated from the organic layer to the scintillator layer and deliquescence of the scintillator layer progressed with lapse of time due to the percolated moisture. On the other hand, regarding the first and second test bodies (plots P1a, P1b, and P1c; and plots P2a, P2b, P2c, and P2d) as well, it could be confirmed that the relative values tended to drop with the lapse of time. However, it was obvious that the degrees of drop in relative value indicated by the first and second test bodies were further curbed than the degree of drop in relative value indicated by the third test body. Accordingly, it has been found that deterioration in characteristics of a scintillator panel can be curbed by providing a barrier layer including TlI as a main component. It has been found that a barrier layer including TlI as a main component can contribute to improvement in moisture resistance of a scintillator panel.

REFERENCE SIGNS LIST 1, 1A, 1B, 1C Scintillator panel
2, 2A, 2B Substrate
2a Substrate front surface
2b Substrate rear surface
2c Substrate side surface
3, 3A Barrier layer
3a Barrier layer front surface
3b Barrier layer rear surface
3c Barrier layer side surface
4, 4A Scintillator layer
4a Scintillator layer front surface
4b Scintillator layer rear surface
4c Scintillator layer side surface
5, 5B Resin protective layer
5A Resin reflective layer
5a Protective layer front surface
5b Protective layer rear surface
5c Protective layer side surface
6, 6A Protective film
7 Laminated body
8 Inorganic reflective layer
8a Reflective layer front surface
8b Reflective layer rear surface
8c Reflective layer side surface
9 Resin film
10, 10A, 10B, 10C, 10D, 10E, 10F, 10G Radiation detector
11 Sensor panel
11a Panel front surface
11b Panel rear surface
11c Panel side surface
12, 12A Sealing portion
12a Outer circumferential edge
12B Sealing sheet
12C Sealing frame
13, 13A, 13B Sealing frame
13a Frame front surface
13b Frame rear surface
13c Frame wall portion
14 Sealing plate
14a Plate front surface
14b Plate rear surface
14c Plate side surface
15 Adhesive
16 Photoelectric conversion element
17 Inner sealing frame
18 Outer sealing frame
S1 Photo-detection region
S2 Surrounding region
S2a Peripheral region
S3 Exposed region

What is claimed is:

1. A radiation detector comprising:
a sensor substrate including an organic material as a main component;
a resin protective layer formed on the sensor substrate and made of an organic material;
a barrier layer formed on the resin protective layer and including thallium iodide as a main component; and
a scintillator layer formed on the barrier layer and constituted of a plurality of columnar crystals including cesium iodide with thallium added thereto as a main component,
wherein the sensor substrate has a photo-detection surface provided with a photoelectric conversion element receiving light generated in the scintillator layer.

2. The radiation detector according to claim 1,
wherein the organic material included in the sensor substrate as a main component is any one of polyethylene terephthalate (PET), polyethylene naphthalate (PEN) and polyimide (PI).

3. The radiation detector according to claim 1,
wherein the organic material forming the resin protective layer includes any one of a xylylene resin, an acrylic resin, a silicone resin, polyimide, a polyester resin, a siloxane resin and an epoxy resin.

4. The radiation detector according to claim 1, further comprising:
a protective film covering a front surface of the resin protective layer, side surfaces of the scintillator layer and a front surface of the scintillator layer.

5. The radiation detector according to claim 4, wherein the protective film is formed by polyparaxylylene.

\* \* \* \* \*